May 5, 1936. C. BATCHELLER 2,039,619
METHOD OF FORMING SHEET PRODUCTS
Filed Feb. 28, 1935 2 Sheets-Sheet 1
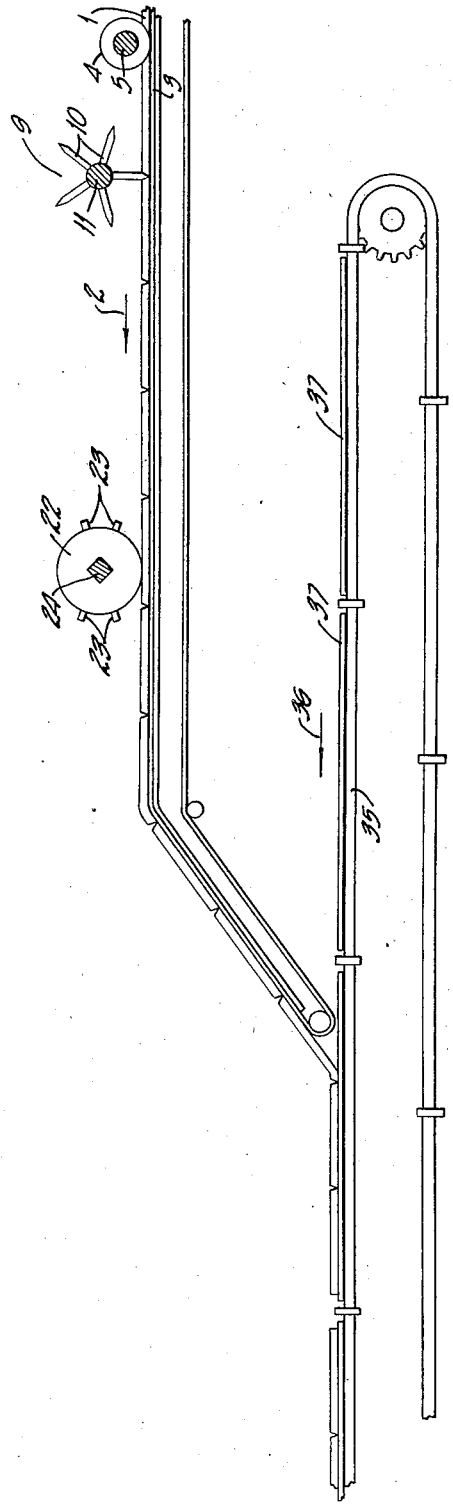
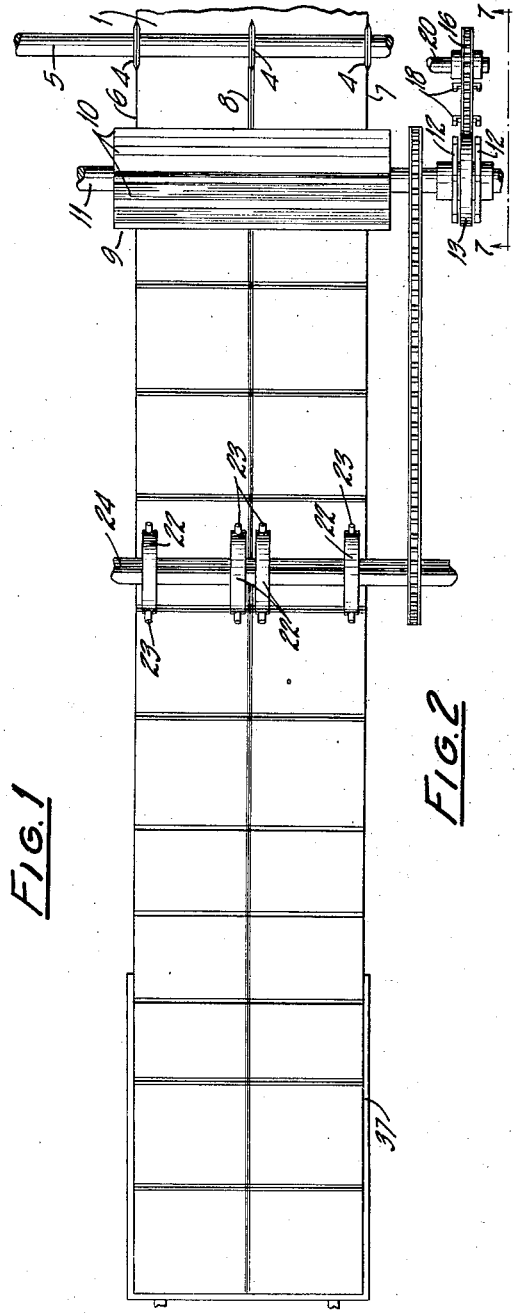
INVENTOR
CLEMENTS BATCHELLER
BY
ATTORNEYS May 5, 1936.   C. BATCHELLER   2,039,619
METHOD OF FORMING SHEET PRODUCTS
Filed Feb. 28, 1935   2 Sheets-Sheet 2

INVENTOR
CLEMENTS BATCHELLER
BY
ATTORNEYS

Patented May 5, 1936

2,039,619

UNITED STATES PATENT OFFICE 2,039,619

METHOD OF FORMING SHEET PRODUCTS

Clements Batcheller, Glens Falls, N. Y.

Application February 28, 1935, Serial No. 8,644

13 Claims. (Cl. 25—155)

My invention relates to shingle or sheet products formed from plastic cementitious fibre mixtures.

The asbestos shingle, as initially formed according to the present processes, is a plastic un-set blank of felted mineral fibres intermixed with a cement, and is usually machine prepared according to one of two methods. Sometimes the machine is designed to produce a continuous, narrow, plastic strip rolled to the approximate width (or length) and thickness of the finished shingles and from which the separate shingle blanks are cross cut by the machine. These blanks are removed from the machine, each placed upon a separate steel press plate of appropriate size, and a vertical column of these products, each upon its individual plate, is built up to an appropriate height. The blanks are then compacted and partially dehydrated by subjecting the column to substantial pressure in a press.

The other method is to form the shingle blank initially as a large plastic sheet upon the drum of a wet cylinder pulp press. When this sheet has been built up to the proper thickness, it is removed from the machine and spread out under a blanking press which cuts the sheet into a definite number of single blanks. These are removed from the press, placed between steel press plates in a vertical column, and pressed in the manner described above.

Shingles commercially produced by the present methods are always initially formed and processed as single blanks which are somewhat larger than the finished product and which must be cut to finished size and shape, and punched, after the blanks have hardened. The waste hard trim which accumulates during these customary methods of production is an important factor in manufacturing cost and often runs as high as 5 to 5½% by weight of the product.

Another disadvantage in the present methods of pressing plastic shingle blanks as individual units is the very great number of steel press plates which must be handled. In the pressing operation there is a steel plate above and below each blank and it is often necessary to handle as many as 25,000 of these press plates to accommodate one day's output.

The pressing of these un-set plastic blanks is necessarily a slow operation. The water forced from each blank can move only in a lateral direction and the pressure must be slowly applied otherwise the internal lateral pressure developed will rupture the blank. The larger the area of the blanks being pressed, the longer the pressing time required because the dewatering starts initially at the center and drains slowly towards the edges of the blank.

A popular size shingle in the industry is the 16 inch by 16 inch hexagonal or honeycomb type which, in the final finishing operations, is cut from a hard blank 16½ inches by 16½ inches having an area of approximately 272 square inches. Blanks of this size while in a plastic state and stacked between steel plates are usually pressed in three to eight minutes depending upon their free water content, whereas a plastic sheet of an area equivalent to six of these blanks or 1,785 square inches will require a pressing time of from 30 to 60 minutes by reason of the fact that the water escapes more slowly from the greater area.

It has always been the practice to press shingle blanks as a single column and of a size as closely approximating the finished product as possible. One of the difficulties encountered in "single stack pressing" has been to prevent the formation of "tapers" in the finished product due to the difficulty in keeping each of the blanks in a true horizontal plane as they are being built up into the stack. In such cases, the stack will invariably bulge in the pressing operation which produces shingles having unequal thicknesses at their opposite edges.

One of the objects of my invention is to provide an improved method of pressing and dewatering shingle and sheet products of this character whereby the usual trimming losses are eliminated and the products are of uniformly accurate gauge throughout. Another object is to provide a method of procedure whereby many of the manual operations now necessary are done away with and the time required to press a given number of shingles is very substantially reduced. Another object is to provide a method of procedure for making sheet products of the character described whereby the usual operations of punching and trimming the hardened products are eliminated.

I have discovered that plastic sheets of comparatively large area can be satisfactorily pressed and dewatered in almost the same time as a built up stack of unit shingles provided drainage channels are formed in the plastic blank to facilitate the drainage of water therefrom.

My invention therefore includes the procedure hereinafter described and illustrated in the accompanying drawings in which—

Fig. 1 is a fragmentary elevation view in diagrammatic form of a machine for performing some of the preliminary steps on my products;

Fig. 2 is a plan view of Fig. 1;

Figure 3:
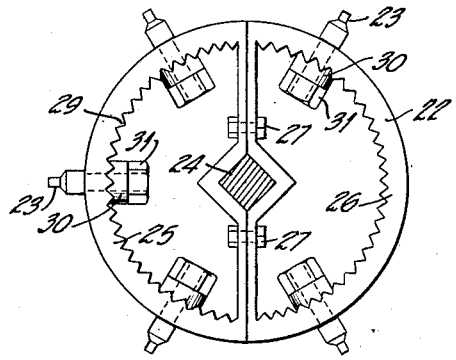
Fig. 3 is an end elevation view of an adjustable type of cutting-punching wheel.

Referring to the drawings, and particularly to Figs. 1 and 2, 1 represents a continuous sheet of plastic material moving in the direction of the arrow 2 and coming from a sheet forming portion of the machine (not shown). This continuous plastic sheet is carried on a rubber conveying belt 3. As the plastic sheet moves in the direction of the arrow, it is first cut or slitted longitudinally by means of the circular knives 4 mounted on shaft 5 which cut the sheet to the desired width, as at 6 and 7, and also make such other cuts 8 longitudinally of the sheet as may be desired. After leaving the slitting knives 4 the plastic sheet passes under a knife, or a series of knives represented generally at 9, which cut or partially cut the sheet transversely into shingles or sheets of a desired size. The individual blades 10 of the transverse cutting knife 9 are radially disposed from shaft 11 which is intermittently turned by the mechanism shown in Fig. 7.

Figure 7:
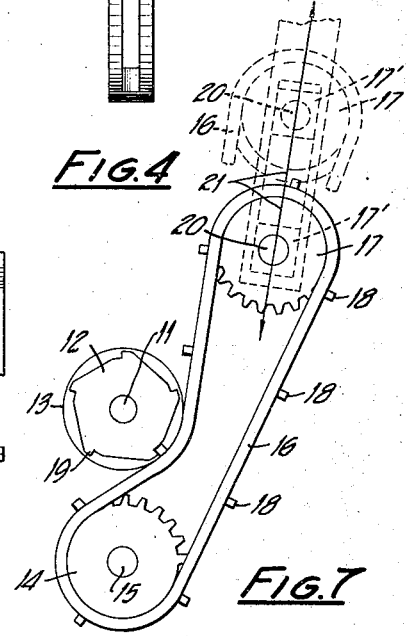
Fig. 7 is a fragmentary detail elevation view of Fig. 2 in about the plane 7—7.
Figure 10:
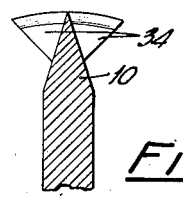
Fig. 10 is a fragmentary section of Fig. 5 in the plane 10—10.

In Fig. 7, a sprocket wheel 14 is mounted on a driven shaft 15 and serves to drive the roller chain 16 extending around the sprocket 17. The back of the chain runs in contact with the base of an idler plate 13. Secured to the chain are spaced lugs 18 which contact the points 19 on the cams 12, as shown in Fig. 7, and turn the cams, and hence the shaft 11 to which the cams are secured, so as to bring the radially disposed transverse cutting knives into contact with the moving plastic sheet at properly timed intervals. The shaft 20 associated with the sprocket 17 is provided with an adjustable mounting 17' so that it may be moved in the direction of the arrows 21 to accommodate chains 16 of different length and having differently spaced lugs thereon. By using chains having differently spaced lugs thereon it is possible to actuate the transverse cutting knives so that shingles of different size may be cut from the plastic sheet. For example, if a cross cut is desired every 16 inches of plastic strip travel, a chain having lugs spaced evenly on 16 inch centers is employed.

Figure 4:
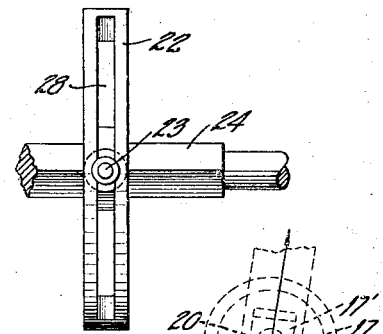
Fig. 4 is a side view of Fig. 3.
Figure 9:
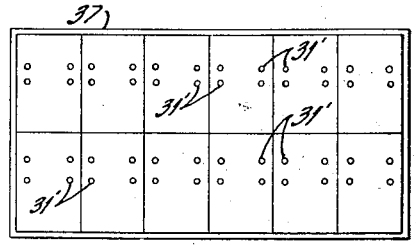
Fig. 9 is a plan view of a blank similar to that shown in Fig. 8 but cut into a different type of shingle.

After leaving the transverse cutting knives, the plastic sheet passes underneath the adjustable punching wheels 22 having punches 23 mounted in the periphery thereof and adapted to punch holes through the individual shingles at the points desired. The wheels 22 are preferably mounted on a square shaft 24 and comprise two half portions 25 and 26 secured together and clamped about the shaft 24 by the bolts 27. By loosening the clamping bolts the wheels 22 may be slid longitudinally of shaft 24 and reclamped in any desired location. The wheel 22 is provided with a peripheral slot 28 and the interior rim of the wheel is provided with teeth or serrations 29. The punches 23 are adjustably secured in a radial position in wheel 22 as shown in Figs. 3 and 4. The inner end of each punch unit is threaded, a washer 30 having teeth or serrations thereon adapted to cooperate with the serrations on the interior of the wheel 22 is slipped over the punch unit, and the whole is drawn up by means of a nut 31. These punches may be so disposed about the periphery of the wheel 22 that holes 31' are produced in the shingle units in any desired places as shown in Figs. 8 and 9.

Figure 5:
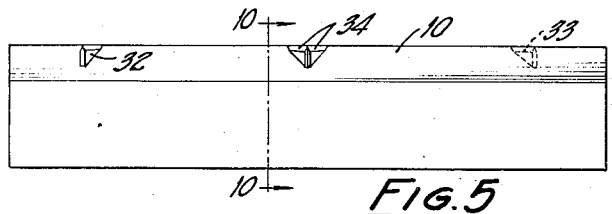
Fig. 5 is an inverted elevation view of a cross cut knife.
Figure 6:
Fig. 6 is a top view of Fig. 5.
Figure 8:
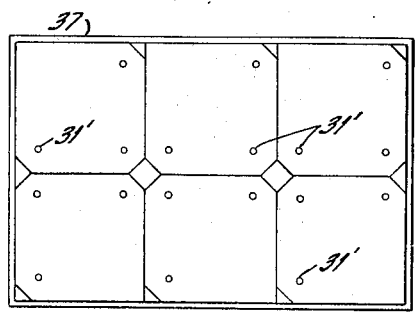
Fig. 8 is a plan view of a blank showing six hexagonal shingles cut therefrom.

The knives 10, one of which is shown in detail in Figs. 5 and 6, are provided with end cutters 32 and 33 and a center square cutter 34 when it is desired to cut hexagonal shingles as shown in Fig. 8.

After the plastic strip is cut longitudinally and transversely into shingle units of the desired size and shape and holes for nails are punched therein, the units are carried along on the rubber belt 3 and delivered onto a second conveyor 35 moving in the direction of the arrow 36. Steel plates of appropriate size to receive the desired number of plastic units are carried by the conveyor 35. For example, if the group of six hexagonal shingles shown in the Fig. 8 is 32 inches by 48 inches the plates 37 may be of about this size. At the left end of the conveyor 35 (not shown) the plates 37, each carrying a plurality of shingles, are removed and stacked one on top of the other. When the stack has been built to capacity height, the blanks are all pressed together.

In the pressing operation the cuts or partial cuts between the individual shingles form channels for the escape of water and the pressing time required is almost equal to that which would be required for pressing a single stack of individual shingles.

One of the great advantages of this method of handling the product in groups is that it requires the handling of fewer pieces and therefore permits a much faster operation of the machine producing the plastic and a much greater productive output.

In some types of shingles it is customary to punch them with two series of holes so as to permit them to be laid with staggered butts by using either set of holes. This method of double punching of the shingle not only introduces a structural weakness in the product but offers the opportunity for the passage of water provided four roofing nails are not used in its application which is seldom the case.

In producing a finished shingle product by the methods above described it is desirable that the holes punched in the plastic blank be made somewhat larger than is desired in the finished blank. If this is not done the holes become partly obliterated in the hydraulic pressing operation. When the holes are made slightly over size there is still a tendency for them to fill up in pressing due to slight lateral movement of the plastic in its reduction of thickness under pressure but they will not be entirely obliterated. They will be found to be sealed or covered with a light film of plastic which is sufficiently thin to permit a roofing nail to be easily driven therethrough. The formation of this film is of great advantage where it is desirable to punch double holes in the shingles because the holes which are unused remain sealed and thus prevent any chance of water passing therethrough.

In addition to the advantages above set forth I have discovered that where a plurality of the units are pressed en bloc and the plastic has taken on its characteristic set the pressed sheet can be removed from the steel pressing sheets as complete units. This is due to the partial coalescence or freezing together of the separate blanks or shingles along the lines of cut due to the very slight expansion of the blanks when subjected to heavy pressure in the stack. Despite this tendency of the cuts to close it will be found that with very slight bending the blanks can be easily broken apart with clean cut edges into a group of finished products so far as shape and size are concerned, and thus the usual step of mechanical trimming and punching is eliminated. This, of course, reduces the waste scrap to a minimum.

After the blanks have been pressed, they must be stored in a moist atmosphere until the cement has completely hydrated. The usual practice is to store the products in a highly humid atmosphere not for the purpose of putting further moisture into the hardened product but primarily for the purpose of retarding evaporation of the uncombined water already present therein. Since the products are usually stored in the fog room in compact stacks of individual blanks, the flow of water therefrom is for the most part in a lateral direction. Hence the greater the area of the product being cured the slower the rate at which its uncombined water evaporates.

Where my process is employed and the unbroken sheets are stored in piles, the loss of water by evaporation is very slight, and it is possible, due to this fact, to store the unbroken sheets in piles outside the curing room and obtain complete hydration by merely covering the piles with tight fitting rubber sheets or jackets.

It is to be understood that my process is not limited to forming the shingles or sheet products from a continuous strip or blank as described above. Where the sheet is initially formed on a wet cylinder pulp press it may be transferred to a press plate of proper size and both sheet and plate passed under appropriate cutting and punching mechanism and pressed en bloc as described above.

What I claim is:

1. The method of forming sheet products of the character described which comprises forming a blank of plastic material, cutting said blank into a plurality of said products, subjecting said blank to pressure to effect a dewatering thereof and a partial coalescence of said products into a substantially unitary slab, and thereafter subjecting said slab to a curing treatment.

2. Those steps in the method of making sheet products of the character described which comprise punching holes in said products while plastic and thereafter compacting and dewatering said product by subjecting it to pressure sufficient to effect the closure of said holes by the formation of a film therein.

3. The method of making sheet products of the character described which comprises forming a blank of a plastic cementitious-fibre mixture, subdividing said blank into a plurality of said products by cutting, and thereafter compacting and partially dehydrating said products by subjecting said cut blank to pressure.

4. The method of making sheet products of the character described which comprises forming a blank of a plastic cementitious-fibre mixture and of an area adapting it to be subdivided into a plurality of said products, forming water passageways in said blank defining substantially the edges of said products, and compacting and partially dehydrating said blank by subjecting it to pressure.

5. Those steps in the making of a sheet product of the character described which comprise forming a blank of a plastic cementitious-fibre mixture of an area adapting it to be subdivided into a plurality of said products and having water passageways extending inwardly from the edges of said blank, and dewatering said blank by subjecting it to pressure.

6. Those steps in the method of making sheet products of the character described which comprise arranging a plurality of said products while plastic in slightly spaced relation in a substantially horizontal plane to provide water passages therebetween and simultaneously dewatering said products by subjecting the whole to pressure.

7. Those steps in the method of making sheet products of the character described which comprise arranging a plurality of said products while plastic on a base element in slightly spaced relation to form a group having drainage passages between said products, arranging a plurality of said groups one upon the other to form a stack, and simultaneously dewatering said products by subjecting the stack to pressure.

8. The method of making sheet products of the character described which comprises arranging a plurality of said products while plastic on a base element in slightly spaced relation to form a group having drainage passages between said products, compacting and dewatering said products by subjecting the whole to pressure sufficient to cause said products partially to coalesce along said passages and form a substantially unitary slab capable of being removed from said base element as such when the plastic has set, and subjecting said slab to a curing treatment.

9. The method of making sheet products of the character described which comprises forming a blank of plastic material, at least partially cutting said blank into a plurality of said products and thereby forming passageways in said blank adapted to facilitate the drainage of water therefrom, subjecting said blank to pressure to effect a partial dewatering thereof, and thereafter subjecting said blank to a curing treatment.

10. The method of making sheet products of the character described which comprises forming a plurality of said products from a plastic cementitious-fibre mixture, effecting an edge to edge union of said products while plastic to form a unitary slab or sheet, and thereafter subjecting the slab or sheet to a curing process to harden the same.

11. That step in the making of sheet products of the character described from a plastic mixture containing hydraulic cement and water which comprises simultaneously subjecting a plurality of said products while plastic and arranged in spaced, edge-to-edge relation to substantial pressure to effect a dewatering thereof.

12. That step in the method of making sheet products of the character described from a plastic mixture containing hydraulic cement and water which comprises simultaneously subjecting a plurality of said products while plastic and arranged in closely spaced, edge-to-edge relation to pressure sufficient to effect a partial coalescence of said products into a unitary sheet.

13. That step in the method of making sheet products of the character described from a plastic mixture containing hydraulic cement and water which comprises forming a plurality of said products into a unitary sheet having lines of weakness therein defining the edges of said products, by the simultaneous application of pressure to said products while plastic.

CLEMENTS BATCHELLER.